T. W. BYRNE.
DIRECTION INDICATOR FOR VEHICLES.
APPLICATION FILED MAR. 15, 1913.

1,127,730.                                          Patented Feb. 9, 1915.

Witnesses:

Inventor:
Thomas W. Byrne
By
Atty

UNITED STATES PATENT OFFICE.

THOMAS W. BYRNE, OF LOS ANGELES, CALIFORNIA.

DIRECTION-INDICATOR FOR VEHICLES.

1,127,730.  Specification of Letters Patent.  Patented Feb. 9, 1915.

Application filed March 15, 1913. Serial No. 754,532.

*To all whom it may concern:*

Be it known that I, THOMAS W. BYRNE, a citizen of the United States, and resident of Los Angeles, in the county of Los Angeles and State of California, have invented certain new and useful Improvements in Direction-Indicators for Vehicles, of which the following is a specification.

My invention pertains to indicating mechanism, and it has special reference to a direction indicator for use on vehicles, where the device will show the direction in which the vehicle is intended to move at crossings or at other places, when it is desirable to point out the proposed direction of travel.

The object is to so construct a device of this character that it will be a complete device in itself and capable of being mounted on any part of an automobile or other vehicle. To that end it comprises a circular case which has a curved solenoid therein, with a similarly curved armature adapted to move within the solenoid, the armature being attached to an axle revoluble in the case and projecting from one side. This axle carries thereon an elongated, dish-shaped blade, in the base of which is an electric lamp, the reflection of which lights up the depressed portion of the blade, so that when the blade swings either to the right or to the left, or remains in a normal vertical position, it will readily be seen by those who are in front or in the rear of the vehicle, as will now be set forth in detail.

Figure 4:
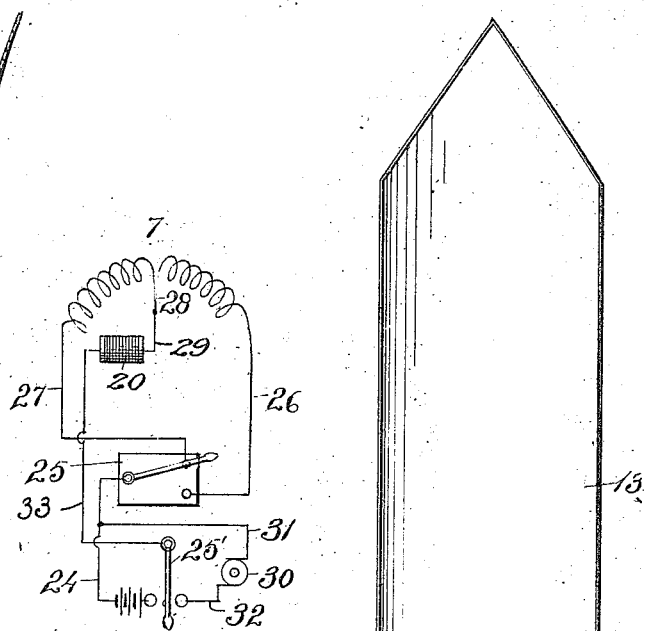
Figure 1:
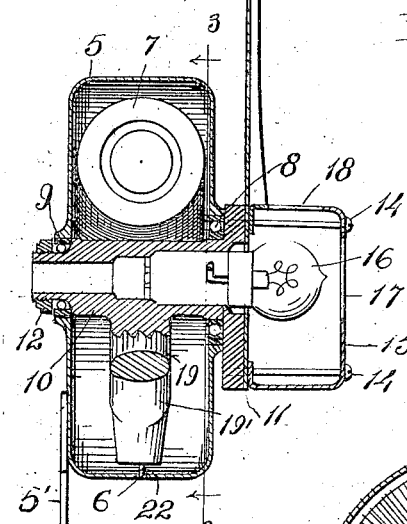
Figure 2:
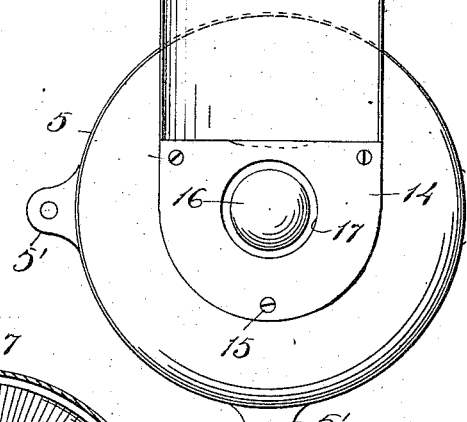
Figure 3:
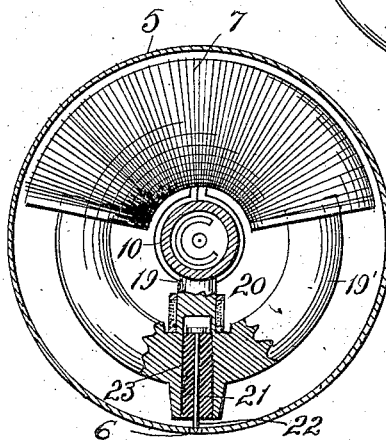

In the accompanying drawing, Figure 1 is a vertical longitudinal section of the device. Fig. 2 is a front view of the case and the cover. Fig. 3 is a vertical cross section of the case, showing the curved armature and the magnet, partly in section, and Fig. 4 is a diagrammatic view of the wiring system.

In carrying out my invention, I construct a circular case or shell 5, the base of which is provided with a perforation 6 through the rim. This case may be secured to a suitable support by means of ears 5' or in any other desired manner. Although the shell as illustrated does not show the particular manner of construction, it may be made in two parts which are afterward secured together either temporarily or permanently. Within the upper portion of the case thus constructed, I mount a curved solenoid 7, which is secured to the case in any convenient manner.

Centrally in the front and in the back of the case 5, I provide roller bearings 8, 9, to receive a revoluble tubular axle 10. This axle has at its front end a head 11, and at its rear end is a threaded collar 12 to hold in the roller bearing and to keep the axle in position. To the head 11 of this axle I attach an arm 13 by means of screws 14, these screws passing through a shield 15 which surrounds an electric lamp 16. This lamp is mounted in a suitable socket within the tubular axle, and the shield has an opening 17 on its front side, so that the lamp may project the light forwardly. An aperture 18 is also formed through the wall of the shield, so that the beams from the lamp may illuminate the arm 13. The arm is in the form of a blade, slightly dished in cross section and having a forward bend, so that the lamp may cast a reflection along the entire length of the arm blade. Within the case the axle 10 has a downwardly projecting arm 19 integral therewith, and to the lower end of this arm is cast a curved armature 19', the ends of which project upwardly and are adapted to enter the solenoid when the axle rocks in either direction.

In order to hold the indicator arm in its normal vertical position, the downwardly projecting arm 19, which carries the armature, has thereon a winding 20 so as to form a magnet of the arm. Directly below the arm the armature is cored and adapted to receive therein a plug 21 of insulating material, and axially through this insulating plug, is a bore to receive therein a metal pin 22. This pin has a head 23, by means of which it is held within the plug 21, a suitable recess being formed in the upper end of the plug for this purpose. As this pin normally projects below the lower surface of the armature and is within operative range of the perforation 6 in the rim of the case, it is obvious that, as the indicator arm 13 swings to a vertical position, the pin 22 will engage with the perforation 6 and thereby hold the arm in a fixed position. As the head 23 of the pin 22 is in close proximity to the magnet 20, the pin will be raised and disengaged from the perforation when the magnet is energized.

It is obvious that the blade may be dished on both sides, so that the indicator will thus show both on the front and the rear of the vehicle. In practice the dished side of the blade may be painted red or any other distinctive color.

In order to illustrate the manner in which the device is wired up, I show a diagrammatic view of the same in Fig. 4, in which both battery and magnet are employed.

The main circuit 24 from the battery goes to one pole of the three-point switch 25, and from the other terminals of this switch are the lead wires 26, 27, to the extremities of the solenoid 7. The solenoid has a separate winding for each end, and these windings are united at 28. Wire 29 connects these windings at 28 and runs to and is connected to one terminal of coil 20. The other terminal of coil 20 is connected by wire 33 to the other side of the battery through switch 25'. The object of this switch 25' is to enable me to use either the battery or the magneto 30, the terminal 31 of the magneto being connected with the main wire 24 from the battery, and the other terminal 32 being connected with the switch 25'.

The operation of the device is as follows: It is mounted at any suitable point on an automobile, so that the dished side of the indicator is in front or in the rear to indicate the direction of the movement of the machine. When the arm of the switch 25 is horizontal, the electric circuit is cut out of the device, but when it is, for instance, moved up, as shown in the diagrammatic view, a circuit is formed from the battery, or from the magneto, through the right hand end of the solenoid and also through the magnet 20. The result is that the pin 21 is raised to free the curved armature and the indicator arm, so that the solenoid draws up the armature to that side and swings the indicator arm to the opposite direction. When the arm of the switch 25 is again placed in a neutral position, the weight of the armature 19' is sufficient to normally swing the indicator arm 13 to a vertical position, but in order to hold the arm rigidly in this vertical position, the pin 21 will engage with the hole 6 for this purpose.

I prefer to have the lamp 10 connected up with the ordinary lighting system used on the automobile, so that it may be entirely cut out during the day, but it is obvious that I may have it connected up with the current that actuates the solenoid.

This invention is especially adapted for use as a tail light to be located on the rear of the automobile, in which position it performs all the functions required of a direction indicator as well.

What I claim as new, is:

1. In a direction indicator, a case, a curved solenoid therein having an independent winding for each end thereof; a tubular axle pivotally mounted in said case; a light in said axle, a curved armature attached to the axle within the case and coöperating with the solenoid, and means for energizing either end of said solenoid.

2. In a direction indicator, a case, a curved solenoid therein having an independent winding for each end thereof; an axle pivotally mounted in said case; an indicator arm attached to said axle, a curved armature secured to the axle of the indicator arm, and means on said armature and case for normally holding the indicator arm in a fixed vertical position.

3. In a direction indicator, a case, a curved solenoid therein having an independent winding for each end thereof; an axle pivotally mounted in said case; an indicator arm attached to said axle, a curved armature attached to said axle within the case and coöperating with the solenoid, an electro-magnet at the lower end of the indicator arm, a vertically movable pin adapted to be actuated by the magnet, said pin being in such a position as to co-act with a perforation in the case, said magnet and solenoid being in a suitable electric circuit, and means whereby both the solenoid and the magnet may be cut in or out by the same mechanism.

4. In a direction indicator, a case, an axle through the case, an elongated dish-shaped indicator blade secured to the projecting end of said axle, a lamp at the base of said dished blade, a shield at the base of the blade inclosing the lamp, provided with openings for projecting the light forwardly and along the dished indicator arm, and means whereby said arm may be held in a fixed vertical position or swung either to the right or to the left at the will of the operator.

5. In a direction indicator, a case, a tubular axle through the case mounted on ball bearings, an indicator arm on one projecting end of the axle, an electric lamp mounted within the hollow axle, a curved solenoid within the case, a curved armature coöperating with the curved solenoid, said armature being secured to the axle by an arm which projects from the axle in a direction opposite to the indicator arm so as to serve as a counter-weight for said indicator arm.

6. In a direction indicator, a case, an axle through the case, an arm secured to the axle, a curved armature secured to an arm which projects in a direction opposite to the indicator arm, a curved solenoid adapted to receive the ends of said armature, said solenoid having at each end a separate winding and a separate circuiting therefrom, a source of electric energy, and a switch intermediate said source of electricity and magneto whereby the current may be diverted to either end of the solenoid.

7. In a direction indicator, a case, an axle through the case, an upwardly projecting indicator arm secured to the axle, a downwardly projecting arm from the axle within the case, a curved armature on the lower end of said arm, a curved solenoid adapted to receive the ends of said armature, said solenoid having at each end a separate winding and a separate circuiting therefrom, an electro-magnet coöperating with a locking pin in the armature and adapted to engage with a perforation in the case, a source of electric energy, and a switch intermediate the source of electricity, the magnet and the solenoid whereby the current may be diverted to either end of the solenoid and simultaneously transmitted through the magnet to disengage the locking pin.

8. In a vehicle direction indicator, a case, a curved solenoid mounted in said case, said solenoid having an independent winding for each end thereof; a tubular axle mounted in said case, a curved armature coöperating therewith, an indicator arm mounted on said tubular axle, and a lamp in said axle for illuminating the indicator arm.

Signed at the city of Los Angeles, county of Los Angeles, State of California, this 6th day of March, 1913, in the presence of witnesses.

THOMAS W. BYRNE.

Witnesses:
  J. YORKE,
  M. RUDHOLM.